United States Patent Office 3,476,698
Patented Nov. 4, 1969

3,476,698
STABILIZED COMPOSITIONS OF POLYOLEFINS CONTAINING SURFACE ACTIVE AGENTS AND PHENOLS
Michel Osterrieth, Brussels, and Georges Voituron, Neder-over-Hembeek, Belgium, assignors to Solvay & Cie, Société en commandite, a simple of the Kingdom of Belgium
No Drawing. Filed Mar. 24, 1966, Ser. No. 442,484
Claims priority, application France, Apr. 10, 1964, 970,555
Int. Cl. C08f 45/58, 45/62, 3/04
U.S. Cl. 260—23         9 Claims

ABSTRACT OF THE DISCLOSURE

A composition which is stable to thermal degradation and discoloration which comprises a polyolefin, a phenolic antioxidant, and an anionic surface active agent. If desired, other stabilizers such as calcium stearate can also be utilized.

---

The present invention concerns stabilized compositions of polyolefins and particularly polymers and copolymers of ethylene, propylene, and butene, obtained by polymerization under low pressure.

Olefins, and in particular ethylene, can be polymerized under low pressure in the presence of catalysts which generally are based on a compound of a polyvalent heavy metal.

It has been proposed to use as catalyst an oxygenated compound of chromium, at least partially in the hexavalent state, used with an inert support chosen from among silica, alumina, zirconia, or thoria (Belgian Patent 530,617).

The polymerization of ethylene has also been done in the presence of a catalytic combination consisting of titanium tetrachloride, aluminum chloride, and metallic aluminum (German Patent 874,215).

It is also known to polymerize ethylene in the presence of a binary catalyst consisting of a compound of a transition metal and a trialkyl derivative of aluminum (Belgium Patent 533,362).

Finally, the polymerization of olefins in the presence of a ternary catalyst formed by reaction of three constituents chosen from among (a) a metal, a hydride, or an organometallic compound of metals of Groups IV–B, V–B, and VI–B of the Periodic Table (Periodic Chart of the Atoms by Henry D. Hubbard, revised 1956 by William F. Meggers, published by W. M. Welsh Mfg. Co., Chicago, Ill.), (b) an inorganic compound of a polyvalent metal having a valence of at least three, and (c) a halide of an element of Groups III–B or V–B (Belgian Patent 547,618) has been described.

The properties of the polymers manufactured according to each of these processes differ in numerous ways, both physical and rheological.

It has been observed, however, that all the polyolefins have the disadvantage of becoming degraded under the effect of the oxidation phenomena which take place, for example, at the time of the heating accompanying the molding operations; or later under the action of the atmospheric agents. This degradation generally involves a strong increase in discoloration and brittleness of the polyolefin object.

The addition of antioxidants and particularly of mono- or bisphenolic alkylsubstituted compounds (Ind. Eng. Chem., 1949, 41 pp. 1442–1447) decreases this degradation to a certain extent. It is not sufficient, however, to inhibit completely the appearance of undesirable discolorations in the polyolefins. It is known, on the other hand, that these antioxidants can discolor polyolefins and mainly those which contain catalytic residues with a base of heavy metals.

To remedy this inadequacy of the usual phenolic antioxidants, it has already been proposed to combine them with a great variety of various additives. Among the latter, the nonpolymer aliphatic polyols (French Patent 1,253,083) and nonionic surface-active agents of the polyethylene glycol or alkylphenol-polyethylene glycol type (Belgian Patent 620,180) have already been cited. All these additives which have aliphatic hydroxyl groups undeniably playing an important role in the process of stabilization are shown to have a doubtful efficacy for inhibiting the development of discoloration in the stabilized polymers.

The applicant has now found that the addition of compounds free from hydroxyl groups to polyolefins obtained under low pressure and containing an antioxidant confers on them a very greatly improved coloring and does not harm their stability at all. The novel additives are anionic surface-active agents.

The invention concerns compositions of polyolefins obtained according to a low-pressure polymerization process and containing 0.001 to 5 weight percent of a phenolic antioxidant and 0.01 to 5 weight percent of an anionic surface-active agent.

It is an object of this invention to provide an improved method of stabilizing compositions of olefin polymers.

Another object is to provide a stabilized olefin polymer composition.

Other objects, advantages, and features will be apparent to those skilled in the art from the following discussion.

The phenolic antioxidants usable in the inventive process belong to the group of alkylphenols and bisphenols. The following examples can be cited especially: 4,4'-thiobis(3-methyl-6-tert-butylphenol), 4,4'-butylidene bis(3-methyl-6-tert-butylphenol), and 2,6-di-tert-butyl-4-methylphenol.

In some cases it can be advantageous to increase the stabilizing effect of the phenolic antioxidants by adding thereto a dialkyl ester of a thiodialkanoic acid, in particular dilauryl thiodipropionate.

Most of the anionic surface-active agents are suitable for the preparation of the compositions which are the object of the invention and confer on them the desired properties of stability and coloring. Compounds belonging to the following classes are used particularly: sulfuric and phosphoric esters of fatty alcohols, alkanesulfonates, alkylarylsulfonates, sulfonation products of long-chain esters and diesters. All these products are used preferably in the form of their sodium salt.

Examples of anionic surface-active agents used successfully in the practice of the present invention are sodium laurylsulfonate, sodium tetradecanesulfonate, sodium dodecylbenzenesulfonate, sodium di(tridecyl) sulfosuccinate, certain complex esters of phosphoric acid and long-chain alcohols and the like. Therefore, it can be seen that the surface-active agents preferably employed in accordance with the invention contain 8 (sodium lauryl sulfonate) to 30 [sodium di(tridecyl)sulfosuccinate] inclusive carbon atoms per molecule.

The stabilizing effectiveness of the compositions which are the object of the invention can be further increased by the addition of well known stabilizers such as calcium stearate.

The amounts of ingredients to be incorporated into the polyolefins vary between 0.001 and 5 weight percent for the phenolic antioxidant and 0.01 to 5 weight percent for the anionic surface-active agent. They depend especially on the nature of the antioxidant and on the surface-active agent used. They depend furthermore more or less strongly on the polymerization process used for the manufacture of the polyolefin and on the degree of purifaction of the polymer which is obtained.

The catalytic residues present to a greater or lesser amount in the polymer actually have a fairly strong influence on its stability. In general, a poorly purified polymer, that is, still containing fairly large amounts of metallic compounds, has a tendency to become changed and to become degraded more rapidly than a practically pure polymer. The amount of stabilizer to be added to the polymer will thus vary as a function of the degree of purification of this latter.

Thus, in the case of a polyethylene prepared in contact with a ternary catalyst such as described in Belgian Patent 547,618, purified by washing with hexane, and then' treated with steam, one of the following formulas preferably is used:

(1)

| | Grams |
|---|---|
| Polyethylene | 1000 |
| 4,4'-thiobis(3-methyl-6-tert-butylphenol) | 0.2 |
| Calcium stearate | 0.1 |
| Sodium laurylsulfonate | 0.2 to 1 |

(2)

| | |
|---|---|
| Polyethylene | 1000 |
| 2,6-di-tert-butyl-4-methylphenol | 0.2 |
| Calcium stearate | 0.1 |
| Sodium tetradecanesulfonate | 0.2 to 1 |

The stabilizers can be incorporated into the polymer in a manner known in itself, for example by impregnating the polymer as a powder or in grains by means of a solution of the stabilizing composition. The impregnation can be done either in a mixer or a grinder wherein the solvent is evaporated or by kneading on heated cylinders or by extrusion of a mixture of the polymer and the stabilizing composition.

Examination of the effectiveness of the various ingredients of the stabilizing compositions is done by subjecting the samples of stabilized polymer to tests which in a very short time allow an evaluation of the long-term stability of these samples.

For example, the samples can be submitted to a test for absorption of oxygen at 180° C. This test rests on the observation that when the polyethylene undergoes a degradation at high temperature in the presence of air, some oxygen is absorbed. In the case of a stabilized sample, this absorption begins after a certain time at the moment at which the action of the stabilizer ceases and the sample begins to become degraded. The duration of the induction period which precedes the beginning of the degradation can be determined: the longer this period, the more satisfactory the stability of the sample. Thus the quality of the various stabilizing compositions can be evaluated by comparing the respective induction periods which are, by convention, expressed in minutes. The principle of this test has been described by Meltzer, Kelley, and Goldey (J. Appl. Polymer Sci., 1960, III, 7, p. 84).

On the other hand, to evaluate the increase of discoloration which accompanies the degradation of a polymer, circular discs 60 mm. in diameter and 3 mm. thick are injection-molded at 250° C.; their discoloration is compared with an arbitrary reference scale on which the value 0 represents a perfectly white polyethylene and the value 5 a brownish polyethylene.

The following examples, without being limiting, are intended to illustrate the present invention.

EXAMPLES 1 TO 8

A polyethylene A obtained by polymerization of ethylene in contact with ternary catalyst with composition $TiCl_4 + AlCl_3 + Sn(C_4H_9)_4$ is separated mechanically from the polymerization diluent, then washed in a column with pure hexane, and finally dried. The polymer cake impregnated with hexane is then subjected to steam stripping, and then dried in a fluidized bed.

The polyethylene obtained has a melt index of 0.4 according to ASTM–D–1238 standard and its actual specific weight is 0.950 gr./cm.$^3$. It contains, as catalyst residues, 80 mg. of Ti, 20 mg. of Al, and less than 5 mg. of Sn per kg. of polymer.

To this polymer the different additives reviewed in Table I are added.

The mixtures are mixed in the molten state in an extruder whose extrudate is cut into cylindrical granules 3 mm. in diameter and 3 mm. long. The rate of absorption of oxygen of these granulated polymers is measured and the duration of the induction period is deduced. The discoloration of the injection-molded discs is evaluated by comparing them with a reference scale. The results of these measurements are summarized in Table I.

TABLE I

| | Composition No. of Examples | | | | | | | |
|---|---|---|---|---|---|---|---|---|
| | 1 | 2 | 3 | 4 | 5 | 6 | 7 | 8 |
| | Parts by Weight | | | | | | | |
| Polyethylene A | 1,000 | 1,000 | 1,000 | 1,000 | 1,000 | 1,000 | 1,000 | 1,000 |
| 4,4'thiobis(3-methyl-6-tert-butylphenol) | 0.2 | 0.2 | 0.2 | 0.2 | 0.2 | 0.2 | 0.2 | 0.2 |
| Calcium stearate | 0.1 | 0.1 | 0.1 | 0.1 | 0.1 | 0.1 | 0.1 | 0.1 |
| Sodium laurylsulfonate (Mersolat H 76) | | 0.2 | 0.5 | 1.0 | | | | |
| Sodium tetradecanesulfonate (Emulgator K 30) | | | | | 1.0 | | | |
| Organic ester complex of phosphoric acid (GAFAC PE-510) | | | | | | 1.0 | | |
| Glycerin | | | | | | | 1.0 | |
| Polyethylene glycol (Carbowax 1000) | | | | | | | | 1.0 |
| Induction period at 180° C., minutes | 90 | 100 | 80 | 90 | 90 | 100 | 80 | 70 |
| Index of coloring | 5 | 1 | 0 | 0 | 0 | 1 | 5 | 5 |

It is observed that only the mixtures conforming to the invention have a perfect coloring and that the corresponding induction period is at least equal to that relative to the mixtures containing only the antioxidant. On the other hand, whether it is the antioxidant alone or the antioxidant treated with a hydroxyl derivative, an inadmissible discoloration is measured each time. In addition, the hydroxyl additives shorten the induction period.

EXAMPLES 9 TO 12

The experiments of Examples 1 to 8 with polyethylene are repeated, but the 4,4'-thiobis(3-methyl-6-tert-butylphenol) is replaced by 2,6-di-tert-butyl-4-methylphenol. The results obtained are shown in Table II.

TABLE II

| | Composition No. of Examples | | | |
|---|---|---|---|---|
| | 9 | 10 | 11 | 12 |
| | Parts by Weight | | | |
| Polyethylene A | 1,000 | 1,000 | 1,000 | 1,000 |
| 2,6 di-tert-butyl-4-methylphenol | 0.2 | 0.2 | 0.2 | 0.2 |
| Calcium stearate | 0.1 | 0.1 | 0.1 | 0.1 |
| Sodium laurylsulfonate (Mersolat H 76) | | 0.1 | | |
| Glycerin | | | 1.0 | |
| Polyethylene glycol (Carbowax 1000) | | | | 1.0 |
| Induction period at 180° C., minutes | 20 | 20 | 25 | 20 |
| Index of coloring | 3 | 0 | 3 | 3 |

It is seen again that the compositions which are the object of the invention (Example 10) are distinctly superior to the others with regard to the discoloration and are not at all inferior to them with regard to the induction period.

EXAMPLES 13 TO 20

A polyethylene B obtained in contact with the ternary catalyst $TiCl_4 + AlCl_3 + Sn(C_4H_9)_4$ is separated by decantation from the polymerization solvent and washed with a mixture of hexane and ethyl alcohol. It is then subjected to steam stripping and dried in fluidized bed.

This polyethylene has a melt index of 1.5 and a true specific weight of 0.954 gr./cm.$^3$. It contains 20 mg. of Ti, 15 mg. of Al, and less than 5 mg. of Sn per kg. of polymer.

To this polyethylene the compound shown in Table III are added and the mixtures are subjected to the same treatments and examinations as those described for Examples 1 to 8. The results are summarized in Table III.

TABLE III

| | Composition No. of Examples | | | | | | | |
|---|---|---|---|---|---|---|---|---|
| | 13 | 14 | 15 | 16 | 17 | 18 | 19 | 20 |
| | Parts by Weight | | | | | | | |
| Polyethylene B | 1,000 | 1,000 | 1,000 | 1,000 | 1,000 | 1,000 | 1,000 | 1,000 |
| 4,4'thiobis(3-methyl-6-tert-butylphenol) | 0.2 | 0.2 | 0.2 | 0.2 | 0.2 | 0.2 | 0.2 | 0.2 |
| Calcium stearate | 0.1 | 0.1 | 0.1 | 0.1 | 0.1 | 0.1 | 0.1 | 0.1 |
| Sodium laurylsulfonate (Mersolat H 76) | | 0.2 | 0.5 | 1.0 | | | | |
| Sodium tetradecanesulfonate (Emulgator K 30) | | | | | 0.5 | | | |
| Glycerin | | | | | | 0.5 | 1.0 | |
| Polyethylene glycol (Carbowax 1000) | | | | | | | | 1.0 |
| Induction period at 180° C., minutes | 80 | 90 | 90 | 80 | 90 | 80 | 90 | 80 |
| Index of coloring | 3 | 0 | 0 | 0 | 0 | 3 | 3 | 3 |

Here again, it is observed that the compositions according to the invention show an excellent thermal stability and very distinctly superior colorings to those of the compositions which do not conform to the invention.

As will be apparent to those skilled in the art, various modifications can be made in my invention without departing from the spirit or scope thereof.

We claim:

1. A composition which comprises in combination a polymer or copolymer of ethylene, propylene or butene; 0.001–5 weight percent with respect to the weight of said polymer or copolymer, of an alkylphenol or bis-phenol antioxidant; and 0.01 to 5 weight percent with respect to the weight of said polymer or copolymer of an anionic surface active agent selected from the group consisting of alkanesulfonates, alkylarylsulfonates, and sulfonation products of esters and diesters, wherein the said sulfonates and sulfonation products contain from 12–30 carbon atoms per molecule; said composition being substantially stable with respect to discoloration and oxidation degradation.

2. A composition according to claim 1 wherein the anionic surface active agent is chosen from the group consisting of sodium laurylsulfonate, sodium tetradecanesulfonate, sodium dodecylbenzenesulfonate, and sodium di-(tridecyl)sulfosuccinate.

3. A composition according to claim 2 wherein the alkylphenol or bis-phenol antioxidant is selected from the group consisting of 4,4'-thiobis(3-methyl-6-tert-butylphenol), 4,4'-butylidene bis(3-methyl-6-tert-butylphenol), and 2,6-di-tert-butyl-4-methylphenol.

4. The composition of claim 3 which also contains calcium stearate, and said polyolefin is polyethylene.

5. Polyethylene obtained by a low pressure polymerization process and stabilized against discoloration and oxidative degradation with an effective amount of 2,6-di-tert-butyl-4-methylphenol and sodium tetradecanesulfonate.

6. A composition which comprises in combination a polymer or copolymer of ethylene, propylene or butene; 0.001–5 weight percent with respect to the weight of said polymer or copolymer of an alkylphenol or bis-phenol antioxidant; 0.01–5 weight percent with respect to the weight of said polymer or copolymer of an anionic surface active agent selected from the group consisting of alkanesulfonates, alkylarylsulfonates, and sulfonation products of esters and diesters, wherein the said sulfonates and sulfonation products contain from 12–30 carbon atoms per molecule; and calcium stearate, said composition being substantially stable with respect to discoloration and oxidation degradation.

7. A composition according to claim 6 wherein the anionic surface active agent is chosen from the group consisting of sodium laurylsulfonate, sodium tetradecanesulfonate, sodium dodecylbenzenesulfonate, and sodium di-(tridecyl)sulfosuccinate, and wherein the alkylphenol or bis-phenol antioxidant is selected from the group consisting of 4,4'-thiobis(3-methyl-6-tert-butylphenol), 4,4'-butylidene bis (3-methyl-6-tert-butylphenol), and 2,6-di-tert-butyl-4-methylphenol.

8. The composition according to claim 7 wherein the polymer is polyethylene.

9. Polyethylene obtained by a low pressure polymerization process and stabilized against discoloration and oxidative degradation with an effective amount of 4,4'-thiobis(3-methyl-6-tert-butylphenol) and sodium laurylsulfonate.

References Cited

UNITED STATES PATENTS

| 2,739,058 | 3/1956 | O'Flynn et al. | 260—23 |
| 2,967,164 | 1/1961 | Aries | 260—23 |
| 2,985,617 | 5/1961 | Salyer et al. | 260—45.95 |
| 3,239,484 | 3/1966 | Stark | 260—23 |

HOSEA E. TAYLOR, Jr., Primary Examiner

U.S. Cl. X.R.

260—30.8, 45.7, 45.95, 874

UNITED STATES PATENT OFFICE

CERTIFICATE OF CORRECTION

Patent No. 3,476,698                                     November 4, 1969

Michel Osterrieth et al.

It is certified that error appears in the above identified patent and that said Letters Patent are hereby corrected as shown below:

In the heading to the printed specification, line 9, "Mar. 24, 1966" should read -- Mar. 24, 1965 --.

Signed and sealed this 17th day of February 1970.

(SEAL)
Attest:

Edward M. Fletcher, Jr.                              WILLIAM E. SCHUYLER, JR
Attesting Officer                                           Commissioner of Patents